United States Patent
Silva

(10) Patent No.: US 9,682,738 B1
(45) Date of Patent: Jun. 20, 2017

(54) COMBINATION WATER BOTTLE AND PHONE HOLDER WITH MIRROR

(71) Applicant: 3G Bikes, LLC, Whittier, CA (US)

(72) Inventor: Clever Silva, Whittier, CA (US)

(73) Assignee: 3G BIKES, LLC, Whittier, CA (US)

( * ) Notice: Subject to any disclaimer, the term of this patent is extended or adjusted under 35 U.S.C. 154(b) by 0 days.

(21) Appl. No.: 15/187,336

(22) Filed: Jun. 20, 2016

Related U.S. Application Data

(60) Provisional application No. 62/339,349, filed on May 20, 2016.

(51) Int. Cl.
*B62J 3/00* (2006.01)
*B62J 11/00* (2006.01)
*H04B 1/3888* (2015.01)

(52) U.S. Cl.
CPC ............ *B62J 11/00* (2013.01); *H04B 1/3888* (2013.01)

(58) Field of Classification Search
CPC ......... B62J 6/00; B62J 3/00; B62J 7/00; B62J 29/00; B62J 33/00; B62J 2099/0026; B62J 2300/0026; B62J 2300/0033; A47K 1/08; A47F 5/00
USPC ............................................. 224/418, 32, 41
See application file for complete search history.

(56) References Cited

U.S. PATENT DOCUMENTS

| | | | | |
|---|---|---|---|---|
| 1,567,092 A * | 12/1925 | Warberg | ............... | A45D 33/025 132/298 |
| 4,415,105 A * | 11/1983 | Jackson | ................... | B62J 9/003 224/420 |
| 4,754,901 A * | 7/1988 | Villanueva | ............... | B62J 11/00 224/418 |
| 5,114,060 A * | 5/1992 | Boyer | ........................ | B62J 7/06 224/413 |
| 5,423,509 A * | 6/1995 | LaPorte | ................... | B62J 11/00 224/414 |
| 5,540,368 A * | 7/1996 | Oliva | ........................ | A45F 5/02 224/242 |
| 5,833,100 A * | 11/1998 | Kim | .......................... | A45F 5/02 224/197 |
| 5,988,577 A * | 11/1999 | Phillips | ..................... | A45F 5/02 224/197 |
| 6,092,707 A * | 7/2000 | Bowes, Jr. | ............... | H01Q 1/42 206/320 |
| 6,357,616 B1 * | 3/2002 | Harris | ..................... | A63B 22/02 220/23.8 |
| D528,967 S * | 9/2006 | Towers | ........................ | D12/409 |
| 7,445,185 B1 * | 11/2008 | Cicero | ................... | A47K 3/281 211/16 |
| 8,887,975 B1 * | 11/2014 | Basile | ...................... | B62J 11/00 224/441 |

(Continued)

*Primary Examiner* — Brian D Nash
(74) *Attorney, Agent, or Firm* — Knobbe, Martens, Olson & Bear, LLP

(57) ABSTRACT

A combination bottle and phone holder has a base, a bottle holder portion and a phone holder portion. In some configurations, the holder also includes a mirror. The bottle holder portion includes a body that is adjustably mounted to the base. The body has an opening configured to receive a water bottle. In some configurations, the mirror is positioned on a deflectable lid that covers the opening. The phone holder portion includes a plate that is adjustably mounted to the base, a first stop and a second stop. The first stop and the second stop are configured to receive and secure a mobile phone therebetween.

11 Claims, 12 Drawing Sheets

(56) References Cited

U.S. PATENT DOCUMENTS

| | | | | |
|---|---|---|---|---|
| 2002/0113185 A1* | 8/2002 | Ziegler | .................... | B62J 11/00 |
| | | | | 248/309.1 |
| 2007/0267454 A1* | 11/2007 | Baiz | ........................ | A45C 5/06 |
| | | | | 224/576 |
| 2012/0205409 A1* | 8/2012 | Quartarone, III | ......... | A45F 3/04 |
| | | | | 224/259 |
| 2012/0325873 A1* | 12/2012 | Stocco | ....................... | A45F 5/00 |
| | | | | 224/267 |
| 2014/0124559 A1* | 5/2014 | Pomerantz | ................ | A41F 9/02 |
| | | | | 224/582 |
| 2014/0263487 A1* | 9/2014 | Conwell | ................... | A45F 5/00 |
| | | | | 224/148.1 |
| 2015/0150356 A1* | 6/2015 | Willows | ................. | B65D 25/22 |
| | | | | 215/395 |
| 2016/0051037 A1* | 2/2016 | Ballard | .................... | A45F 3/16 |
| | | | | 224/269 |
| 2016/0183667 A1* | 6/2016 | MacColl | ................... | A45F 5/00 |
| | | | | 224/222 |

* cited by examiner

COMBINATION WATER BOTTLE AND PHONE HOLDER WITH MIRROR

BACKGROUND

Field

The disclosure relates to holders for objects, including water bottles and phones. The disclosure also relates to such a holder having a mirror. The holder can be mountable to a vehicle, such as a bicycle.

Description of the Related Art

Bottle holders have been used to hold a water bottle relative to a vehicle, such as a bicycle. Phone holders that hold a phone relative to a vehicle, such as a bicycle, also exist.

SUMMARY

However, the prior art does not include a bottle holder in combination with a phone holder. An embodiment disclosed herein involves a combination bottle and phone holder. In some embodiments, the combination bottle and phone holder includes a mirror.

The systems, methods and devices described herein have innovative aspects, no single one of which is indispensable or solely responsible for their desirable attributes. Without limiting the scope of the claims, some of the advantageous features will now be summarized.

In some configurations, a combination bottle and phone holder has a base, a bottle holder portion and a phone holder portion. In some configurations, the holder also includes a mirror. The bottle holder portion includes a body that is adjustably mounted to the base. The body has an opening configured to receive a water bottle. In some configurations, the mirror is positioned on a deflectable lid that covers the opening. The phone holder portion includes a plate that is adjustably mounted to the base, a first stop and a second stop. The first stop and the second stop are configured to receive and secure a mobile phone therebetween.

In some configurations, the base is a U-shaped bracket.

In some configurations, the body is rotatably coupled to the base at an upper end portion of each of a pair of side portions of the U-shaped bracket.

In some configurations, the body is coupled to the base at a center of the body.

In some configurations, the plate is coupled to the base by at least one link member.

In some configurations, in a first orientation of the combination bottle and phone holder, the plate contacts an end surface of the body such that the body assists in supporting the plate relative to the base.

In some configurations, the plate contacts the body at a support location spaced from a connection location at which the at least one link member is connected to the plate.

In some configurations, the end surface of the body is not perpendicular with respect to a face surface of the plate.

In some configurations, a distance between the first stop and the second stop is adjustable.

In some configurations, one of the first stop and the second stop is fixed relative to the plate and the other of the first stop and the second stop is adjustable relative to the plate.

In some configurations, each of the first stop and the second stop comprises an angle such that each is positioned next to two surfaces of a mobile phone carried by the phone holder portion.

In some configurations, the plate and the body are capable of lying flat against one another.

In some configurations, the holder further comprises a mirror.

In some configurations, the mirror is located on a deflectable lid that covers the opening of the body and can be deflected away from the opening.

In some configurations, a mount is configured to allow the combination bottle and phone holder to be secured to an object.

In some configurations, the mount comprises a clamp.

In some configurations, the mount further comprises a bracket between the base and the clamp.

In some configurations, the bracket is an L-bracket.

In some configurations, the body is rotatably coupled to the base.

In some configurations, the plate is coupled to the base by a pair of link members with one of the pair of link members on each side of the plate.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 1:
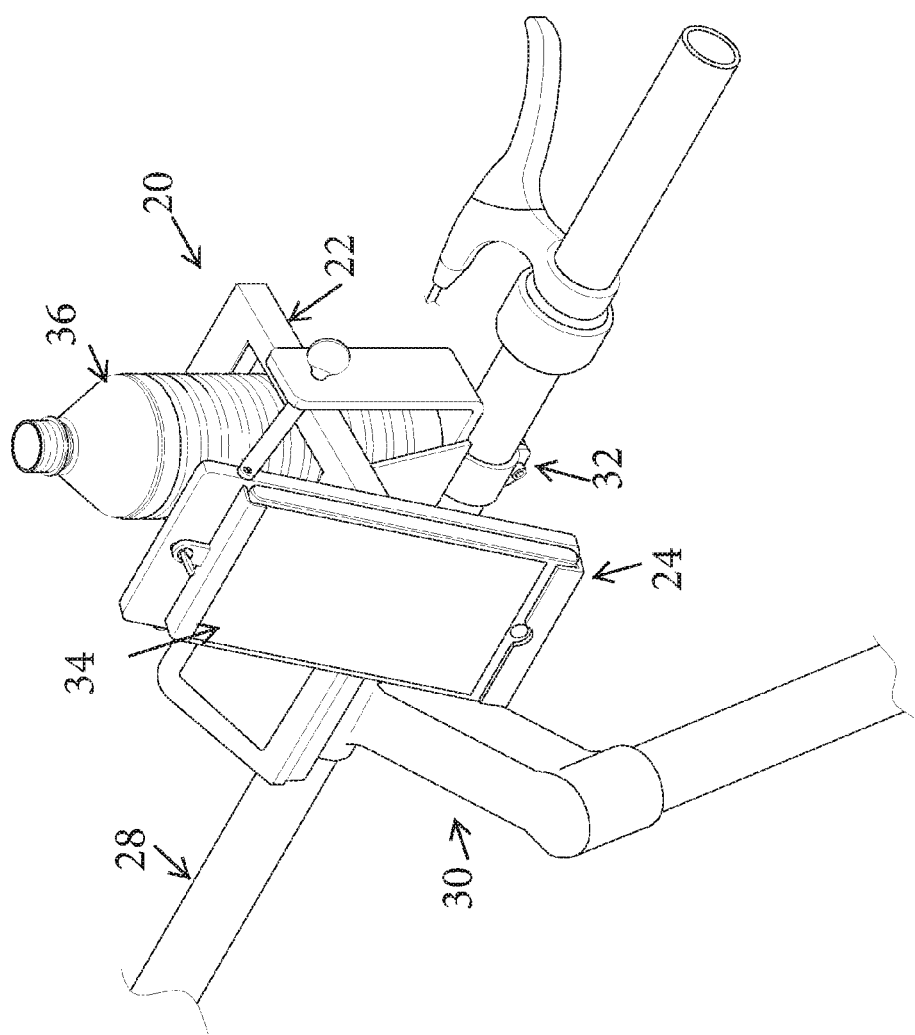
FIG. 1 is a perspective view of a combination bottle and phone holder, which includes a mirror, mounted to a handlebar of a bicycle.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 2:
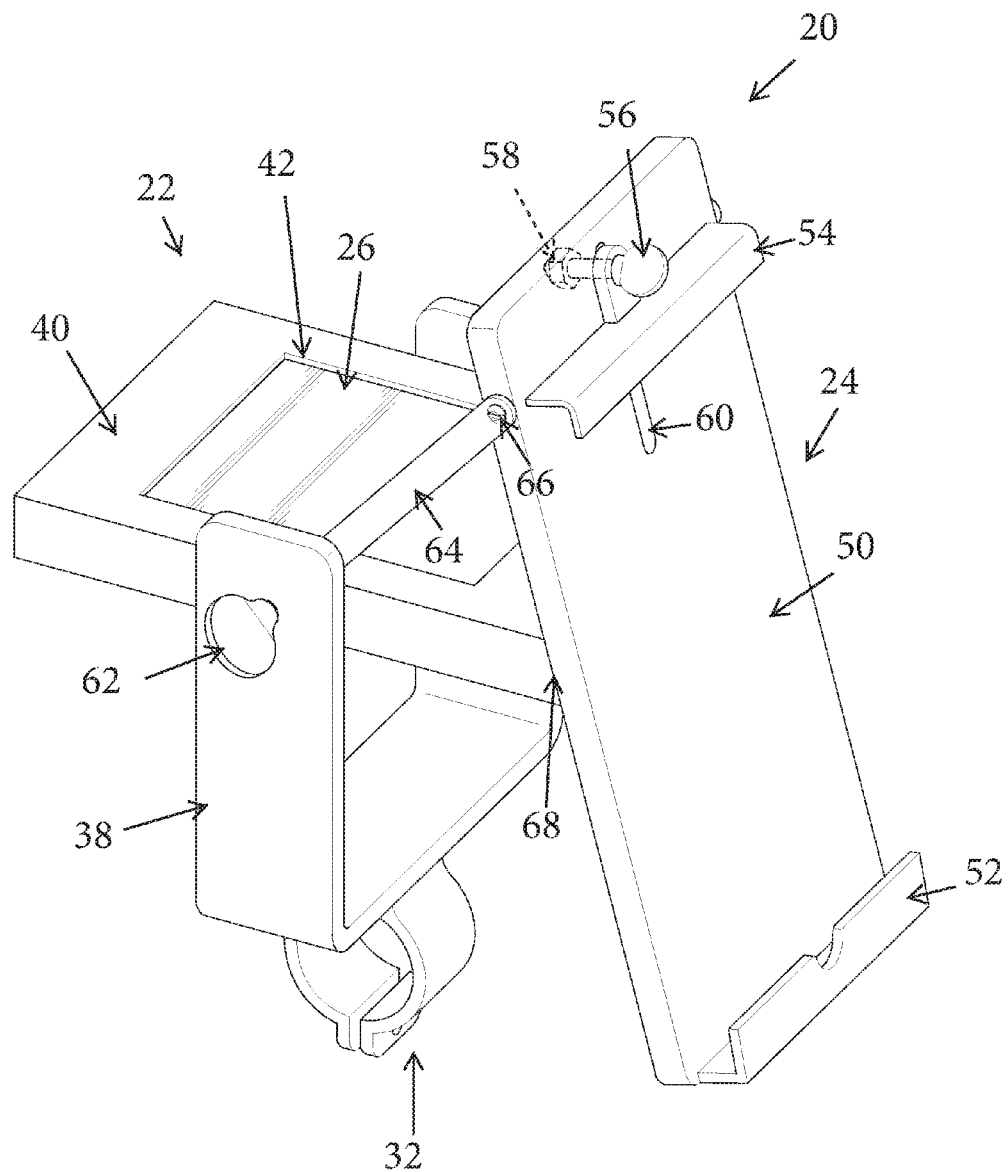
FIG. 2 is a perspective view of the holder of FIG. 1 separate from the bicycle.
Figure 3:
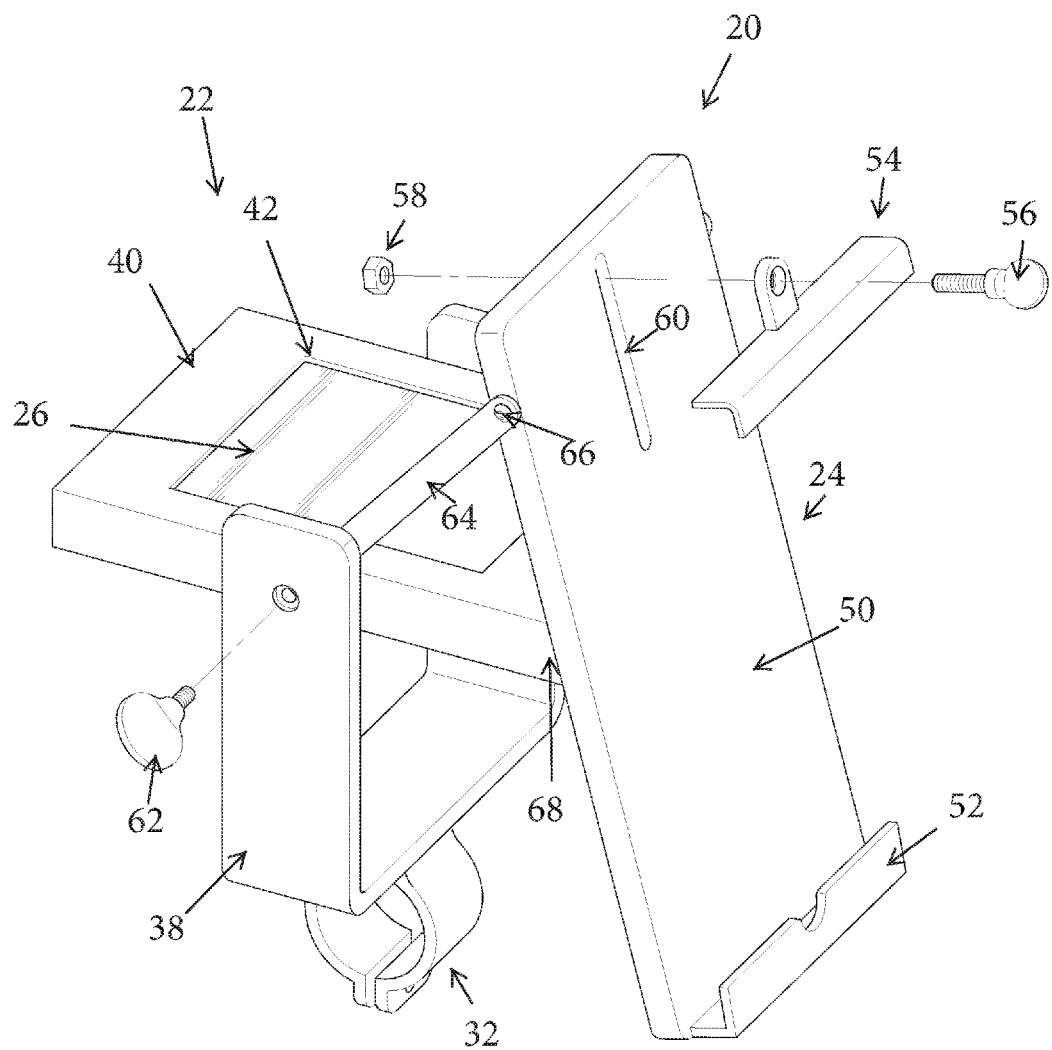
FIG. 3 is a perspective view of the holder of FIG. 1 with adjustment members in an exploded condition.

FIGS. 1-10 illustrate an example of a combination bottle and phone holder 20. The illustrated holder 20 includes a bottle holder portion 22 and a phone holder portion 24. In addition, the illustrated holder 20 includes a mirror 26 (FIG. 2). In FIG. 1, the holder 20 is illustrated mounted to a handlebar 28 of a bicycle 30 by a mount portion 32. The holder 20 is illustrated supporting a phone 34 and a water bottle 36.

The holder 20 includes a body or base 38, which in the illustrated arrangement is a U-shaped bracket. The mount portion 32 is coupled to the bottom of the base 38. The illustrated mount portion 32 is a clamp that is sized to surround and be secured to a cylindrical object, such as the bicycle handlebar 28. However, other types of mounts can also be used to allow the holder 20 to be mounted to other objects.

Figure 8:
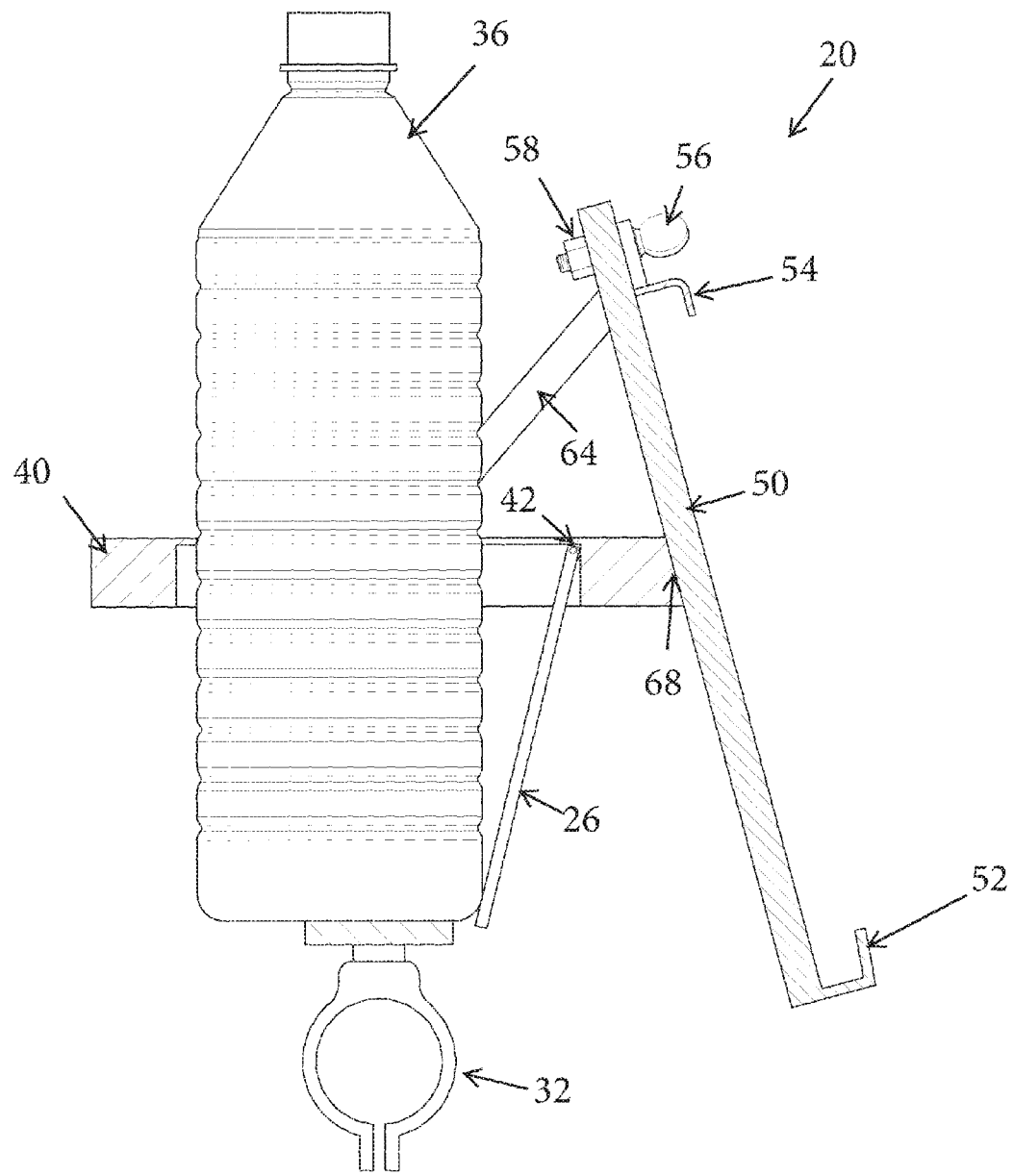
FIG. 8 is a sectional view of the holder of FIG. 1 supporting a first size water bottle.
Figure 9:
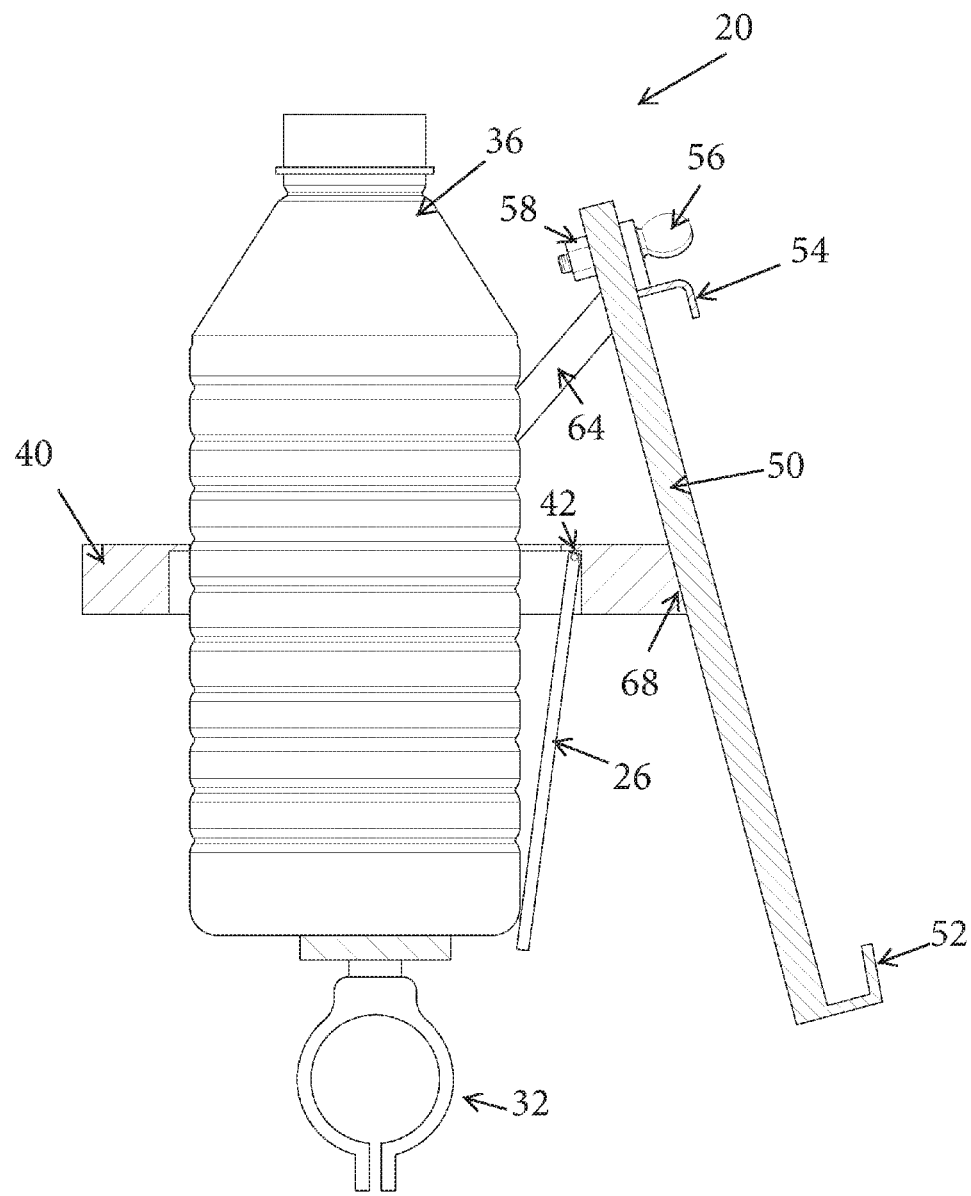
FIG. 9 is a sectional view of the holder of FIG. 1 supporting a second size water bottle.
Figure 10:
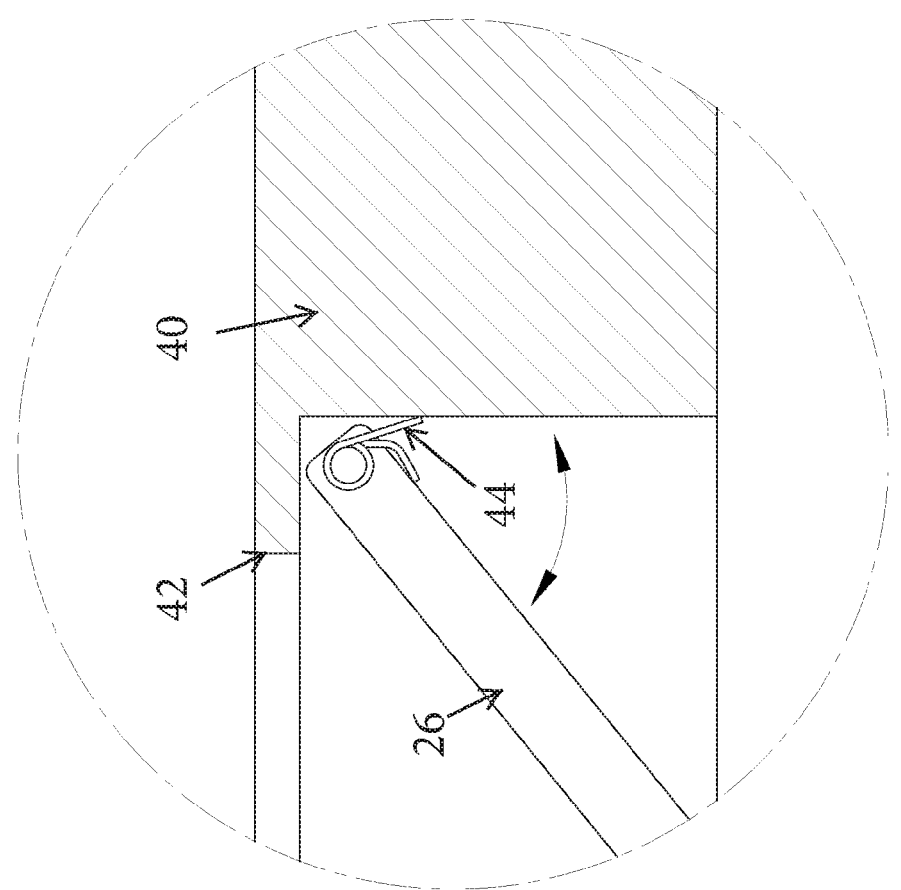
FIG. 10 is an enlarged view of a portion of a mirror cover and bottle holder of the holder of FIG. 1.

The bottle holder portion 22 comprises a body 40 in the form of a plate that defines an opening 42. The opening 42 is surrounded on all sides by the body 40. In the illustrated arrangement, the body 40 is rectangular cuboid through which the opening 42 extends. However, in other arrangements, the body 40 can have other shapes, such as annular, for example. In the illustrated arrangement, the mirror 26 forms a lid that partially or fully covers the opening 42. The mirror 26 pivots to uncover the opening 42 to allow a bottle (e.g., water bottle 36) to pass through the opening 42, as illustrated in FIGS. 8 and 9. The mirror 26 can be pivotally attached to the body 40 by any suitable arrangement, such as by a pair of pivot pins or projections on one of the mirror 26 and body 40 and corresponding receptacles on the other of the mirror 26 and body 40. FIGS. 8 and 9 also illustrate that the opening 42 is sized to allow water bottles 36 of different sizes to be accommodated by the bottle holder portion 22. For example, FIG. 8 illustrates a relatively smaller diameter water bottle 36 and FIG. 9 illustrates a relatively larger diameter water bottle 36. With reference to FIG. 10, a biasing member 44, such as a spring, can act on the mirror 26 to bias the mirror 26 to a closed position.

The phone holder portion 24 comprises a support or base in the form of a plate 50. A first stop 52 is located at or near a first end of the plate 50 and a second stop 54 is located at or near a second end of the plate 52, which is opposite the first end in the illustrated arrangement. A phone (e.g., phone 34 of FIG. 1) can be held between the first stop 52 and the second stop 54. The first stop 52 is in the form of an angle or L-shaped from a side view such that it can contact or be positioned next to two surfaces of the phone (e.g., a bottom and a front surface) with the plate 50 contacting or being positioned next to a third surface (e.g., a rear surface). The second stop 54 can also be an angle or L-shaped from a side view to be positioned next to two surface of the phone.

In the illustrated arrangement, the first stop 52 is fixed relative to the plate 50 and the second stop 54 is movable relative to the plate 50 and/or the first stop 52 to allow insertion of a phone into the space between the stops 52, 54. In some configurations, the second stop 54 can have an adjustment range a distance of which is sufficient to permit different size phones to be held by the phone holder portion 24. In the illustrated arrangement, the second stop 54 is manually adjustable. For example, the second stop 54 can be secured to the plate by a manually operable fastener assembly (e.g., thumb screw 56 and nut 58). The fastener assembly can pass through a vertical slot 60 in the plate 50 such that the position of the second stop 54 relative to the plate 50 and the first stop 52 can be adjusted by moving the fastener assembly within the slot 60. In an alternative arrangement, the second stop 54 could be biased (by, e.g., a spring) toward the first stop 52, can be moved to allow insertion of the phone and then can be released to allow the biasing element to secure the phone between the stops 52, 54. The first stop 52 can be coupled to the plate 50 in any suitable manner, such as by being unitarily formed with the plate 50.

Figure 4:
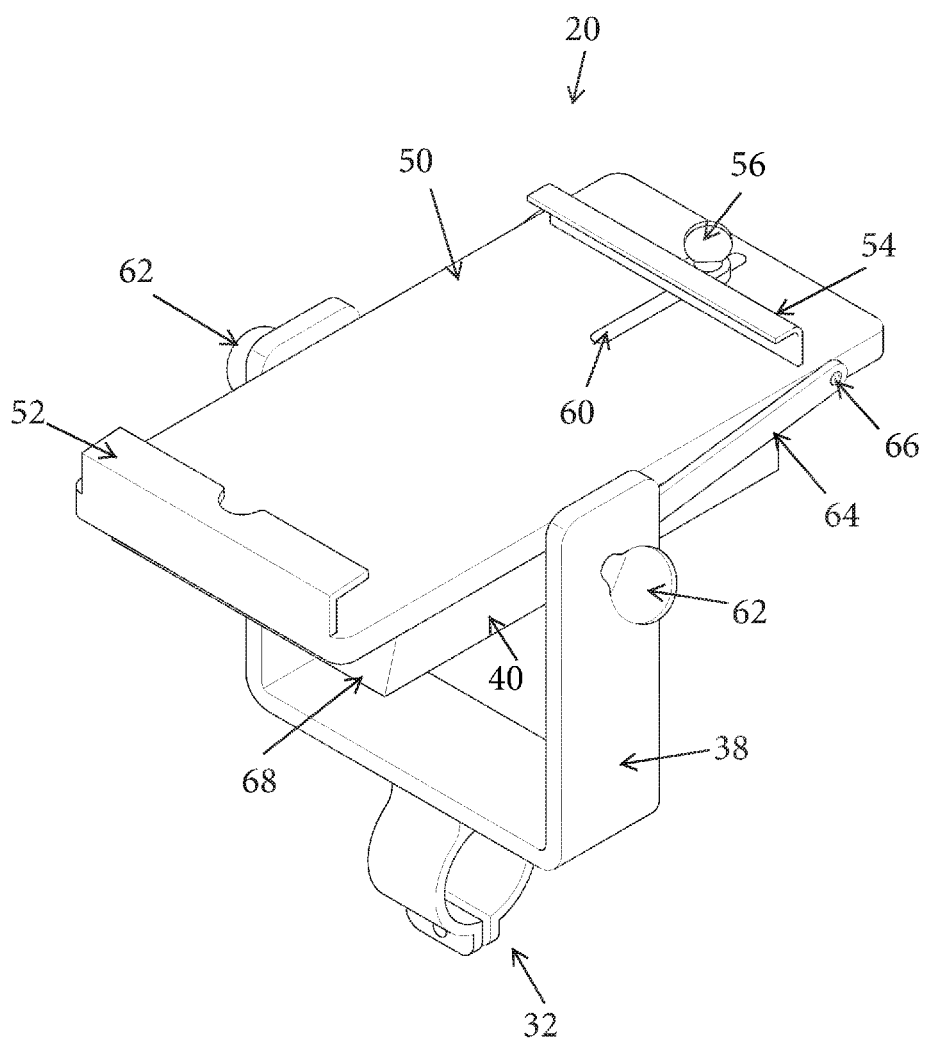
FIG. 4 is a perspective view of the holder of FIG. 1 in a different adjustment position relative to the position of FIGS. 1-3.
Figure 5:
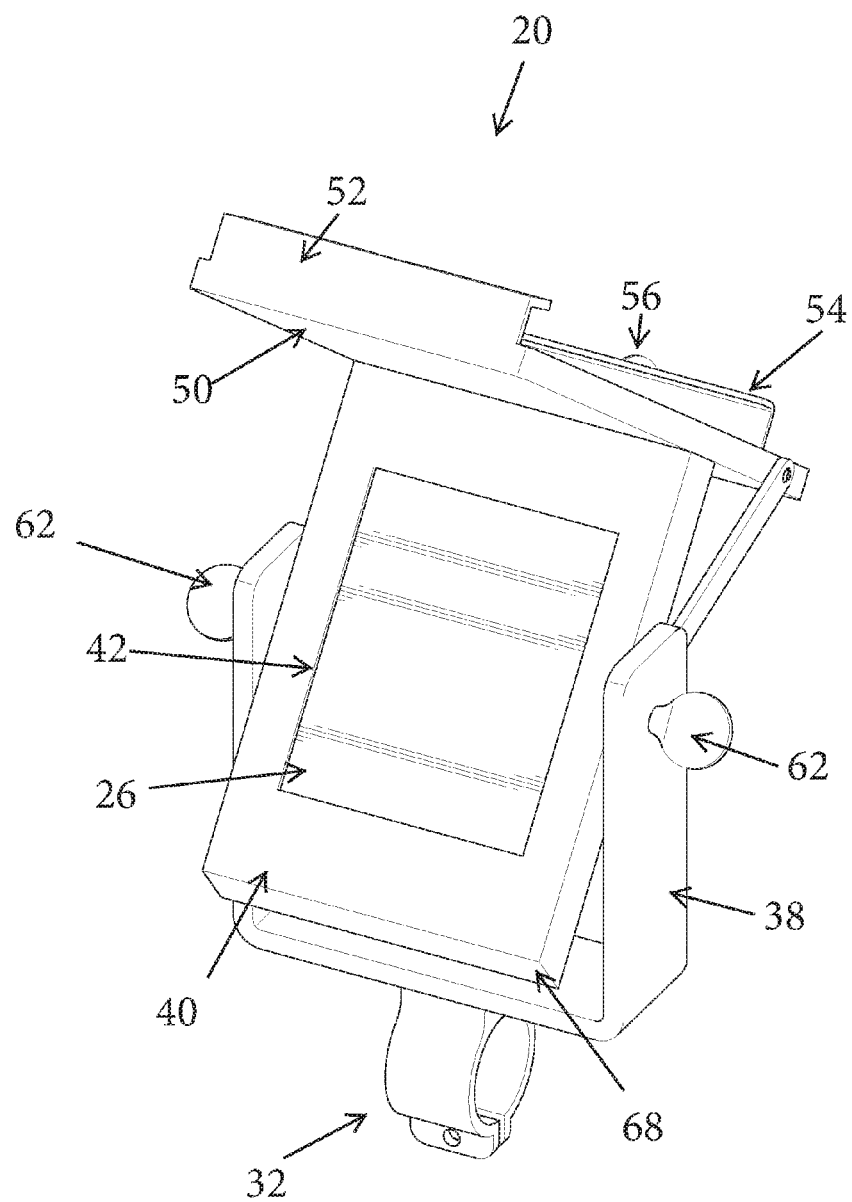
FIG. 5 is a perspective view of the holder of FIG. 1 in yet another adjustment position.
Figure 6:
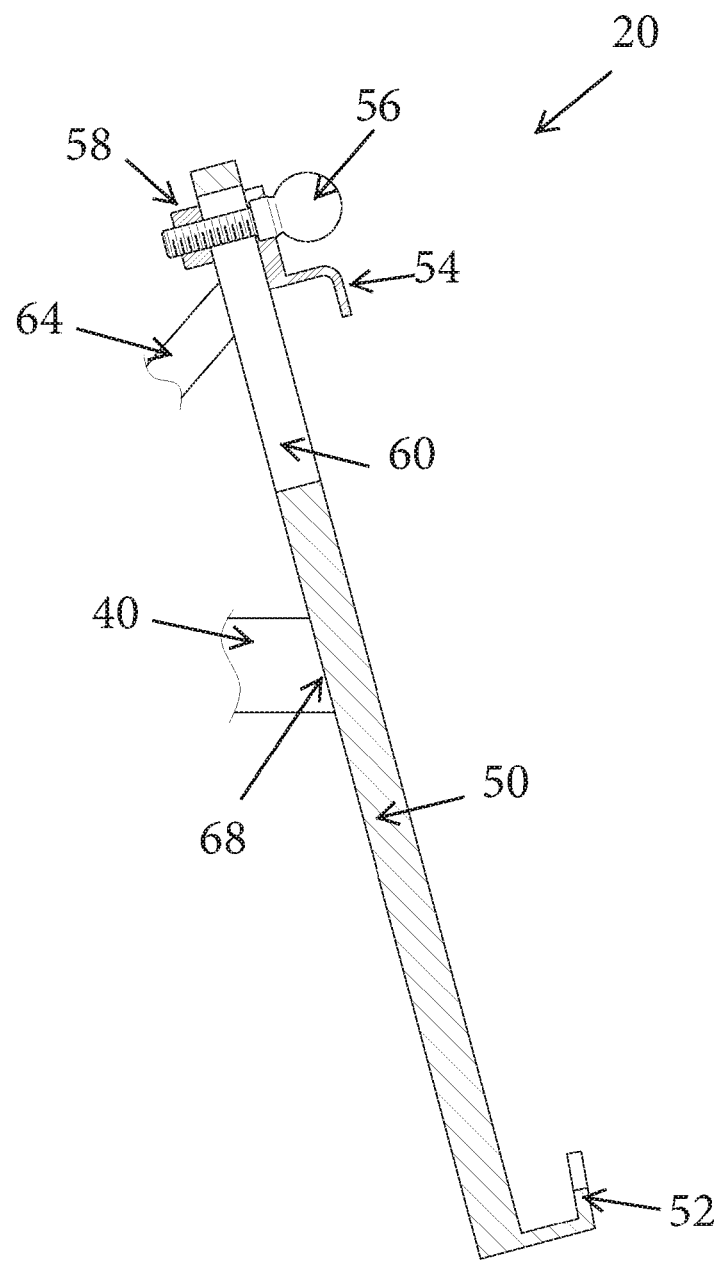
FIG. 6 is a sectional view of a phone mount portion of the holder of FIG. 1.
Figure 7:
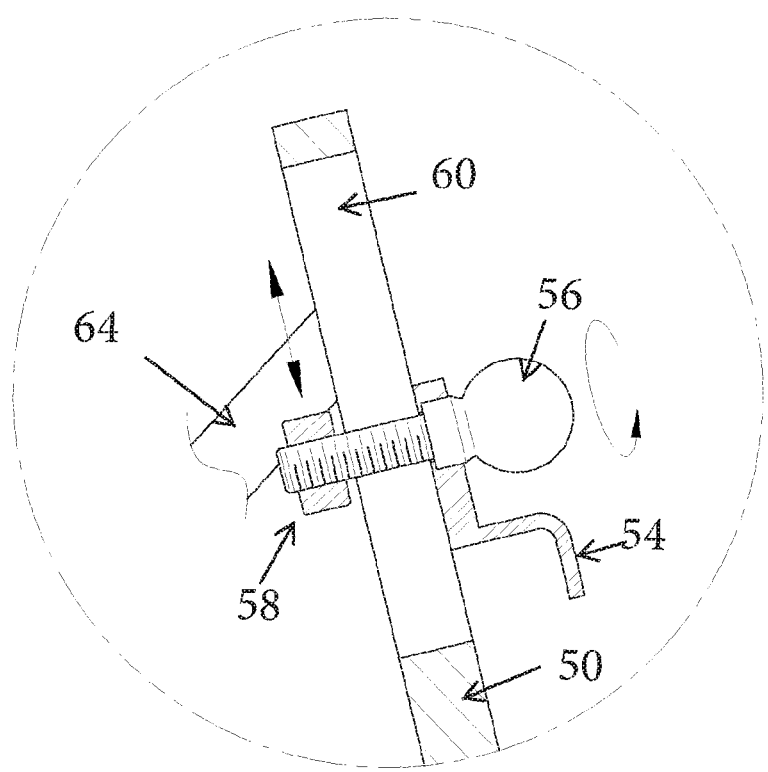
FIG. 7 is an enlarged view of an adjustment portion of the phone mount portion of FIG. 6.

In the illustrated arrangement, one or both of the bottle holder portion 22 and the phone holder portion 24 can be adjustable into multiple positions relative to the base 38 to allow the holder 20 to assume multiple operational modes. In the illustrated arrangement, each of the bottle holder portion 22 and the phone holder portion 24 is adjustable relative to the base 38. For example, FIGS. 1 and 2 illustrate a bottle holding and phone holding mode. FIG. 4 illustrates a flat phone mode and FIG. 5 illustrates a mirror mode.

The body 40 of the bottle holder portion 22 is supported relative to the base 38 for rotation about an axis. In particular, the body 40 is supported at or near a center of the body 40 by a suitable fastening arrangement at or near an upper end of the U-shaped base 38. In the illustrated arrangement, the body 40 is secured to the base 38 by a manually operable fastener 62 (e.g., a thumb screw) on each side of the body 40. The fasteners can be loosened to permit rotation of the body 40 relative to the base 38 and tightened to secure the body 40 in a desired position relative to the base 38. Other suitable arrangements can also be used. For example, the body 40 could be supported on an axle or pin(s) for movement relative to the base 38 and another suitable retention mechanism could be provided to secure the body 40 in a desired adjusted position.

In the illustrated arrangement, the plate 50 of the phone holder portion 24 can be indirectly connected to the base 38, such as by a pair of link members 64. A link member 64 is provided on each side of the plate 50. Each link member 64 has a first end coupled at or near one end (e.g., an upper end in FIGS. 1 and 2) of the plate 50 and a second end coupled to the base 38. In the illustrated arrangement, the second end of the link members 64 are coupled to the base 38 so as to be rotatable about the same adjustment axis as the body 40 of the bottle holder portion 22. In some configurations, the link members 64 can be secured to the base 38 by the same fastener(s) (e.g., thumb screws 62) as the body 40. The first end of the link members 64 can be rotatably coupled to the plate 50 by any suitable arrangement, such as a fastener 66 (e.g., screw, rivet, pin, etc.).

In the illustrated arrangement, the plate 50 is supported relative to the base 38 by the link members 64 and by the body 40. That is, the body 40 contacts and/or supports the plate 50 at a position spaced from first ends of the link members 64. In some configurations, and end surface 68 of the body 40 that contacts the plate 50 in the bottle holding and phone holding mode of FIGS. 1 and 2 is angled or non-perpendicular with a front face of the body 40 such that the plate 50 is supported at an angle relative to one or both of the body 40 and base 38.

One or more of the length of the sides of the U-shaped base 38, the length of the body 40, the length of the plate 50 and the length of the link members 64 can be configured such that the body 40 can be rotated relative to the base 38 without interfering with the base 38. Similarly, the plate 50 can be moved from one side of the base 38 to the other side of the base 38. Such an arrangement facilitates the movement of the body 40 and plate 50 relative to the base 38 to achieve the desired operational positions or modes.

For example, as illustrated in FIGS. 1 and 2 (among others), in the bottle holding and phone holding mode, the body 40 is positioned at least substantially perpendicular to the side portions of the U-shaped base 38 and the plate 50 rests against the body 40 at an angle with respect to both the body 40 and the side portions of the base 38. As illustrated in FIG. 1, the mirror lid 26 can be folded down to allow a bottle 36 to be held by the holder 20. FIGS. 8 and 9 illustrate bottles 36 of different sizes supported by the holder 20.

As illustrated in FIG. 4, the plate 50 can be positioned to lay flat against the body 40 such that both the body 40 and the plate 50 are substantially perpendicular to the side portions of the U-shaped base 38. Such a position or mode can allow access to the phone 34 in a more compact arrangement than the phone and bottle mode. FIG. 5 illustrates a mirror mode in which the body 40 (and, thus, the mirror 26) is positioned at an angle relative to the side portions of the U-shaped base 38. The mirror 26 can be positioned at any position relative to the base 38 (including vertical or aligned with the side portions) as desired by the user. The plate 50 can be moved above the mirror 26 to allow for an unimpeded line of sight from the user to the mirror 26. In the illustrated arrangement, the plate 50 contacts an opposite end of the body 40 relative to the orientation of FIGS. 1 and 2. This end of the body 40 can be perpendicular to the front face such that the plate 50 can be substantially perpendicular to the body 40.

Figure 11:
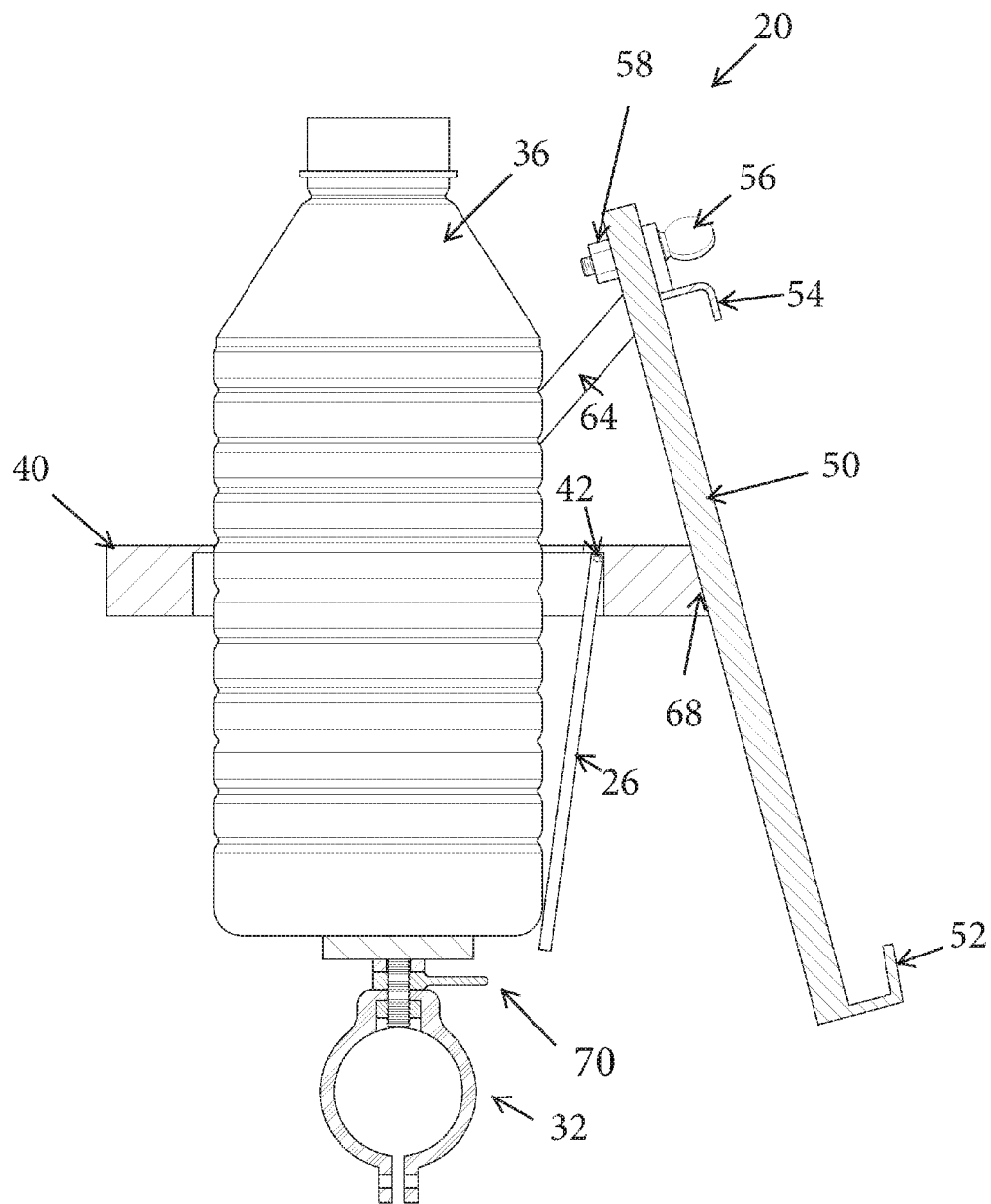
FIG. 11 is a sectional view of a modification of the holder of FIG. 1.

FIG. 11 illustrates a modification of the holder 20 of FIGS. 1-10. The holder 20 of FIG. 11 can be substantially the same as or similar to the holder 20 of FIGS. 1-10. However, the holder 20 of FIG. 11 includes a modification of the mount portion 32. The mount portion 32 of FIG. 11 allows the base 38 to rotate relative to the mount portion 32 so that a rotational position of the base 38 can be adjusted. The mount portion 32 comprises a manually-operable nut 70 that allows a rotational adjustment of the base 38 to be set. The manually-operable nut 70 can have a handle portion that allows the manual or tool-less operation of the nut 70.

Figure 12:
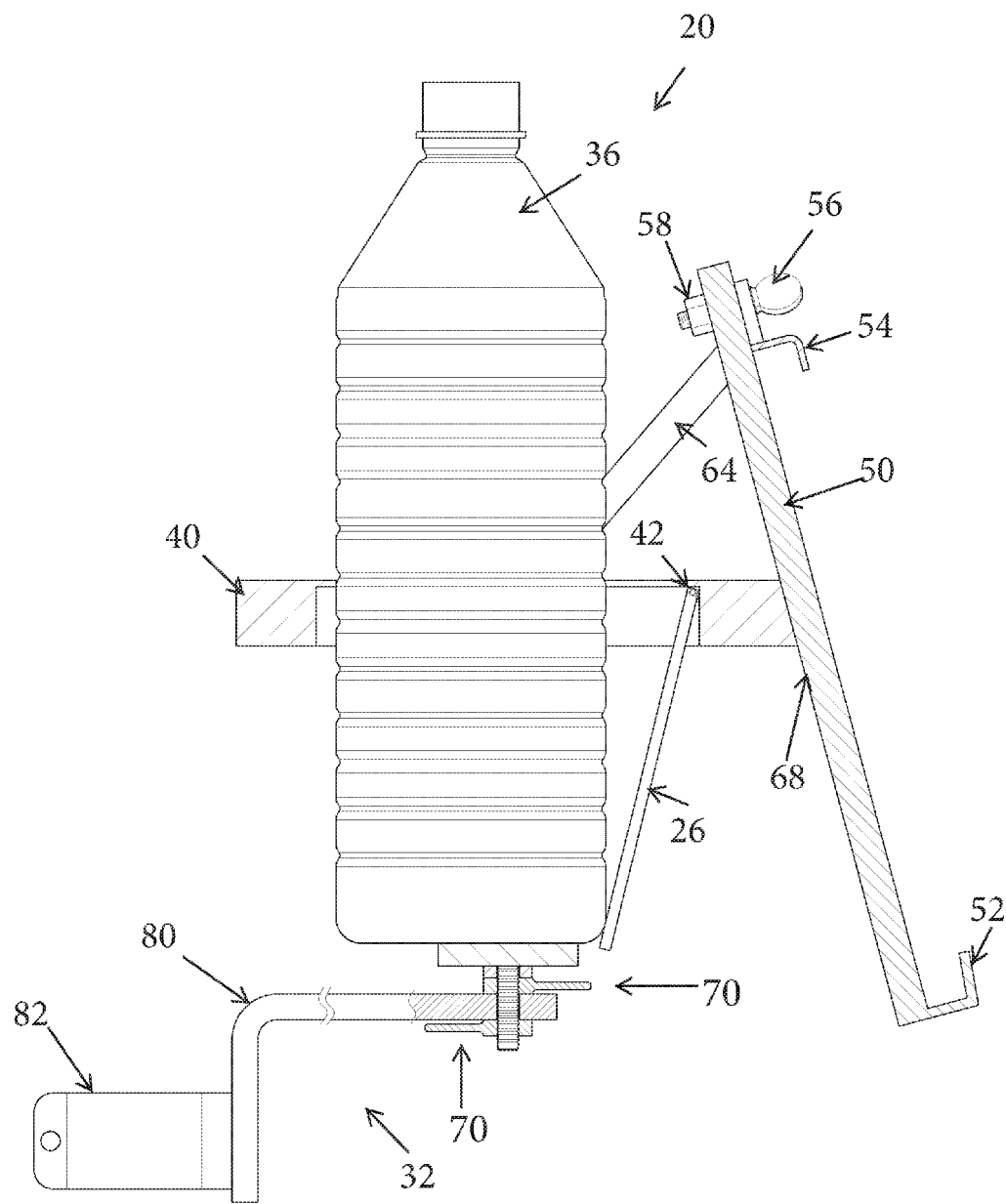
FIG. 12 is a sectional view of another modification of the holder of FIG. 1 having an alternative mount.

FIG. 12 illustrates another modification of the holder 20 of FIGS. 1-10. The holder 20 of FIG. 12 can be substantially the same as or similar to the holder 20 of FIGS. 1-10. However, the holder 20 of FIG. 12 includes another modification of the mount portion 32, which comprises a bracket 80 extending from the base 38 to a clamp 82. In the illustrated arrangement, the bracket 80 is an angle bracket or L-bracket. The bracket 80 allows the base 38 to be located at a spaced distance from the object to which the clamp 82 is secured and, in some configurations, allows the orientation of the base 38 relative to the object to which the clamp 82 is secured to be different from that shown in FIG. 1. For example, in the arrangement of FIG. 12, the holder 20 or at least the base 38 can be oriented vertically when secured to a vertical bar, post or other suitable structure in contrast to the horizontal handlebar 28 of FIG. 1. The mount portion 32 of FIG. 12 includes a pair of manually-operable nuts 70, with one on each side of the bracket 80. Similar to the arrangement of FIG. 11, the nuts 70 of FIG. 12 allows manual adjustment of the rotational position of the base 38 relative to the bracket 80.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A combination bottle and phone holder for mounting on a cycle handlebar, comprising:
  a base comprising a U-shaped bracket having a bottom portion and two side portions that extend from the bottom portion;
  a bottle holder portion comprising a body that is rotatably mounted to ends of the two side portions of the base opposite the bottom portion for rotation relative to the base, the body being positioned between the ends of the two side portions and mounted to the two side portions at intermediate locations on opposing sides of the body, the body further comprising an opening configured to receive a water bottle;
  a phone holder portion comprising a plate that is adjustably mounted to the base by a pair of elongate link members, a first stop and a second stop, the first stop and the second stop configured to receive and secure a mobile phone therebetween, wherein the first stop and the second stop are configured to be located on opposite sides of the mobile phone;
  a clamp mount attached to the bottom portion of the body and configured to apply a clamping force to the cycle handlebar to mount the combination bottle and phone holder to the cycle handlebar;
  wherein the body can be adjusted perpendicular to the two side portions of the base such that the water bottle passed through the opening can rest against the bottom portion of the base, and wherein the plate of the phone holder portion can be adjusted to rest against an end surface of the body at a location spaced from mounting points of the elongate link members to the phone holder portion.

2. The combination bottle and phone holder of claim 1, wherein the body is coupled to the base at a center of the body.

3. The combination bottle and phone holder of claim 1, wherein the end surface of the body is not perpendicular with respect to a face surface of the plate.

4. The combination bottle and phone holder of claim 1, wherein a position of at least one of the first stop and the second stop is adjustable relative to the plate such that a distance between the first stop and the second stop is adjustable.

5. The combination bottle and phone holder of claim 4, wherein one of the first stop and the second stop is fixed relative to the plate and the other of the first stop and the second stop is adjustable relative to the plate.

6. The combination bottle and phone holder of claim 4, wherein each of the first stop and the second stop comprises an angle such that each is positioned next to two surfaces of a mobile phone carried by the phone holder portion.

7. The combination bottle and phone holder of claim 1, wherein the plate and the body are capable of lying flat against one another.

8. The combination bottle and phone holder of claim 1, further comprising a mirror.

9. The combination bottle and phone holder of claim 8, wherein the mirror is located on a deflectable lid that covers the opening of the body and can be deflected away from the opening.

10. The combination bottle and phone holder of claim 1, wherein the mount further comprises a bracket between the base and the clamp.

11. The combination bottle and phone holder of claim 10, wherein the bracket is an L-bracket.

* * * * *